United States Patent [19]

Isley

[11] 3,933,638

[45] Jan. 20, 1976

[54] LIQUID FUEL PURIFICATION SYSTEM

[75] Inventor: Walter F. Isley, Grosse Pointe, Mich.

[73] Assignee: Teledyne Industries, Inc., Los Angeles, Calif.

[22] Filed: June 7, 1974

[21] Appl. No.: 477,538

[52] U.S. Cl. .................. 210/97; 210/130; 210/168; 210/360; 261/5

[51] Int. Cl.$^2$ .................. B01D 33/40

[58] Field of Search ............. 210/97, 117, 132, 133, 210/134, 137, 168, 172, 223, 130, 360; 261/5, 6, 36 A, 34 R

[56] References Cited

UNITED STATES PATENTS

| | | | |
|---|---|---|---|
| 2,236,769 | 4/1941 | Armbruster | 210/223 |
| 2,886,057 | 5/1959 | Dolza et al. | 261/5 |
| 3,270,884 | 9/1966 | Bremer | 210/133 X |
| 3,275,148 | 9/1966 | Vicino | 210/168 |
| 3,415,383 | 12/1968 | Earle, Jr. et al. | 210/168 X |
| 3,572,507 | 3/1971 | Juskeric | 210/97 |
| 3,572,582 | 3/1971 | Seielstad, Jr. | 210/168 |
| 3,599,792 | 8/1971 | Stripp | 210/168 |
| 3,771,656 | 4/1973 | Leamig | 210/168 |

*Primary Examiner*—Theodore A. Granger
*Attorney, Agent, or Firm*—Gifford, Chandler & Sheridan

[57] ABSTRACT

A liquid fuel purification system has a centrifuge in parallel with a conventional filter. Both the centrifuge and the filter are in fluid communication with a reservoir of liquid fuel and with a user of liquid fuel, such as an internal combustion engine. A by-pass valve device selectively effects the movement of fuel through either the centrifuge or the filter responsively to centrifuge speeds. The latter, in a preferred embodiment, is responsive to engine speeds.

7 Claims, 4 Drawing Figures

LIQUID FUEL PURIFICATION SYSTEM

BACKGROUND OF THE INVENTION

I. Field of the Invention

The present invention relates to a system for cleaning or purifying liquids and more particularly to fuel purification devices for engines or motor vehicles.

II. Description of the Prior Art

Conventional fuel filtering devices used to purify liquid fuel used in engines have a number of drawbacks, particularly when used in military vehicles, in off-road vehicles such as are used in the construction industry, and in all-terrain recreational vehicles. Vehicles of these types operate in extremely hostile environments resulting in short service life of the usual fuel filtering devices. The fuel filtering devices must therefore be changed at frequent intervals resulting in extensive vehicle down time. Furthermore, in order to make such that the fuel filter devices are properly operating a maintenance schedule must be rigorously followed. From a practical standpoint, this becomes impossible, particularly with military vehicles used in a war zone, because they cannot be routinely serviced at planned or scheduled short intervals. Therefore, in the interest of expediency, the clogged or inoperative fuel filter is removed from the fuel system allowing contaminated fuel to reach the engine with the resulting damage to vital engine parts.

An additional problem associated with the known fuel filtering devices, again particularly with military vehicles, is that, because they must be regularly changed, a large stock pile of replacement fuel filters is required. This further complicates an already difficult logistics problem.

There is, therefore, a need for a fuel purification system which is relatively inexpensive, easy to maintain and has an extended service life.

SUMMARY OF THE INVENTION

The present invention is a liquid flow system comprising: (a) a filter; (b) a centrifuge in parallel with said filter; and (c) a bypass valve means to selectively effect the movement of liquid through either said centrifuge or said filter. As applied to the fuel system supplying an engine the system uses a conventional porous filter element during engine start up and subsequently shifts to a centrifuge once the engine is in operation. Because the conventional porous filter element is used only intermittently and only for short intervals, such as at engine startup, its service life is greatly extended over that of a fuel filter used exclusively and continously. The centrifuge used for removal of foreign particles and water after the engine has started need not be replaced, but only cleaned. Further, the motor vehicle need not be removed to a service area for cleaning of the centrifuge since it can easily be cleaned in the field, and in a short time, by the driver of the motor vehicle.

Similarly, the use of both centrifuge and filter has advantages over the use of a centrifuge alone in that the combination provides for adequate cleaning of a fuel during start up of the engine.

In a preferred embodiment, the fuel purification system comprises a centrifuge in fluid communication with a fuel tank and an engine and a conventional porous filter also in fluid communication with the fuel tank and the engine, the filter and centrifuge being in parallel. A centrifugally actuated valve is disposed within the centrifuge to control the flow of fuel through the centrifuge and a pressure actuated valve is operatively associated with the filter to control the flow of fuel through the filter. During engine start-up, the centrifuge does not turn fast enough to effectively separate foreign particles and water from the fuel. Therefore, to prevent dirt and water from reaching the engine before the centrifuge attains sufficient rotational speed, the fuel is first routed through the conventional filter to the engine. The pressure operated valve associated with the filter is opened by the initial fuel pressure. After the engine starts, the speed of the centrifuge increases to a point where it can effectively separate the foreign particles from the fuel. At this point the centrifugal force actuated valve opens allowing fuel to flow through the centrifuge to the engine. As fuel flows through the centrifuge, the pressure of the fuel flowing to the filter decreases to a point where it no longer can maintain the pressure actuated valve open. The pressurized actuated valve then closes preventing fuel flow through the filter. At this point, the engine is fed by fuel which has been centrifuged and is substantially free of water and particulate matter.

In the case where an aqueous liquid is to be cleaned the centrifuge separates out relatively heavier particulate matter and relatively heavier water insoluble liquids.

DESCRIPTION OF THE DRAWINGS

A better understanding of the present invention will be had upon reference to the accompanying drawings in which like numerals refer to like parts throughout the several views and in which.

DESCRIPTION OF A PREFERRED EMBODIMENT

Figure 1:
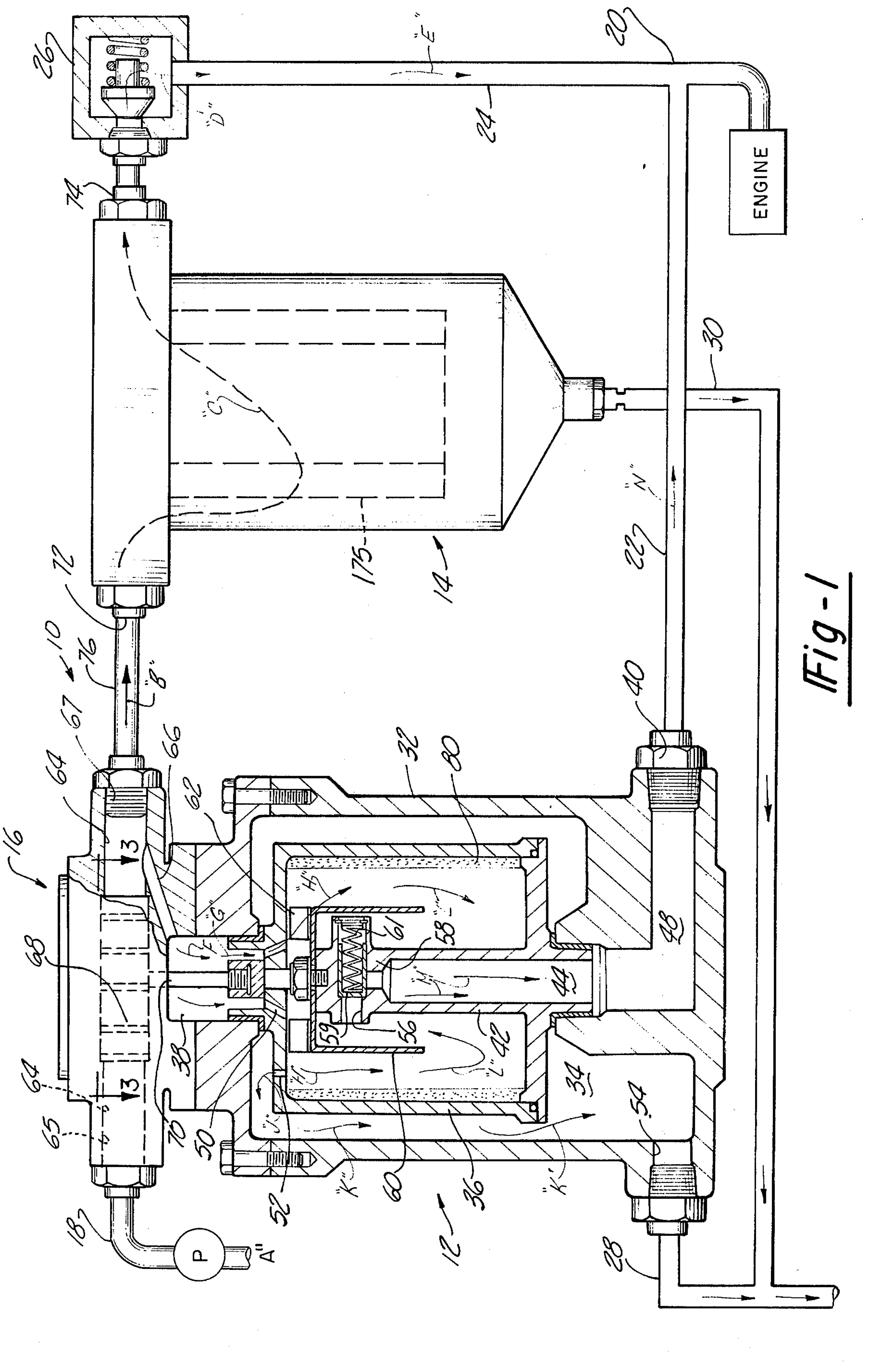
FIG. 1 is a sectional view of a preferred embodiment of the liquid flow system of the present invention.

Referring now to FIG. 1, a liquid purification system 10 is shown as including a centrifuge 12 and, in parallel therewith, a conventional porous filter 14. A liquid bypass 16 is connected, in series, to the centrifuge 12 and also in series, to the filter 14. The purification system 10 is in liquid communication with a source of liquid, which for purposes of this description will be assumed to be a liquid fuel tank (not shown), by means of a fuel carrying conduit 18 and with a user of liquid fuel, which for purposes of this description will be assumed to be an internal combustion engine, by means of a fuel carrying conduit 20.

The centrifuge 12 is also in liquid communication with the exit conduit 20 by means of a conduit 22. Similarly, the filter 14 is in liquid communication with the exit conduit 20 by means of a conduit 24.

A fuel pressure actuated valve 26 is disposed in the conduit 24. The system 10 also includes a water drain line 28 from the centrifuge 12 and a water drain line 30 from the filter 14 to continuously bleed water therefrom. Water separated from the fuel may be disposed of in any suitable manner.

The centrifuge 12 comprises a housing 32 having a hollow interior 34 which contains a hollow rotating centrifuge drum 36. The housing 32 includes an inlet port 38 for receiving fuel from the bypass 16 and an outlet port 40 for passage of clean fuel to the conduit 22, to conduit 20, and to the engine. The drum 36 includes a core 42 having a hollow interior 44 and is connected to the rotating drum 36 for rotation therewith about the longitudinal axis of the drum 36. A passageway 48 provides a means of fluid communication between the hollow interior 44 of the core 42 and the outlet port 40 of the housing 32. An inlet passageway 50 provides for fuel flow from the housing inlet port 38 to the interior of the rotating drum 36. An aperture 52 is also disposed in the wall of the drum 36 to expel separated water from the interior of the drum into the hollow interior 34 of the centrifuge housing 32. Such water subsequently drains through a drain port 54 into the water drain line 28.

The interior 44 of the core 42 is in fluid communication with the interior of the drum 36 by means of an aperture 56 in the core 52. A centrifugal force actuated valve 58 is disposed in the aperture 56 as a means for controlling the flow of fuel through the centrifuge 12. The valve 58 comprises a plunger 59 spring actuated to a closed position by spring 61. The weight of the plunger 59, the spring rate of the spring 61, and the center of gravity of the plunger 59, are of predetermined values such that when the drum 36 has reached a sufficient predetermined rotational speed the centrifugal forces generated effect the opening of the valve 58. The drum 36 also includes a cylindrical baffle 60 concentrically disposed therein and adapted to direct incoming fuel toward the inside wall of the drum 36 and to restrict the inward flow of fuel. Vanes 62 are connected to the baffle 60 and are positioned in the flow of incoming fuel through the inlet passageway 50 so that the incoming fuel will impinge upon the vanes 62 in a manner to assist the rotation of the fuel with the drum 36.

The bypass 16 comprises a bypass channel 64 having an inlet 65 in fluid communication with the conduit 18, an oulet 67 and a branch aperture 66 providing fluid communication between the bypass channel 64 and the centrifuge inlet port 38.

Figure 3:
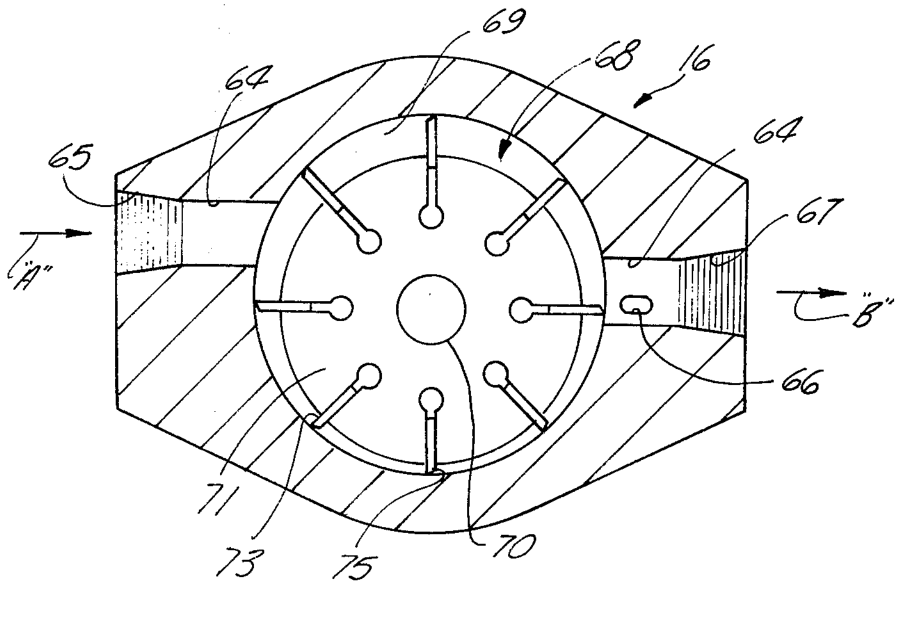
FIG. 3 is a view taken along line 3—3 of FIG. 1.

Referring to FIGS. 1 and 3, a hydraulic motor 68 is disposed within a chamber 69 in the bypass channel 64 and is drivingly connected to the drum 36 by means of a shaft 70 so that the fuel flowing in the bypass channel 64 drives the drum 36. The hydraulic motor 68 is shown as a vane motor, however it will be apparent that a variety of motors such as the gear or plunger type will also work satisfactorily. The vane motor 68 comprises a rotatable hub 71 having a plurality of radially extending vanes 73 disposed therein. The vanes are biased outwardly of the hub 71 by springs (not shown), so that the tips 75 of the vanes 73 are in contact with the walls of the chamber 69. The fuel in the channel 64 impinges upon the vanes 73 causing the hub 71 to rotate. The rotating hub 71 drives the shaft 70.

Referring once again to FIG. 1, the porous filter 14 comprises an inlet port 72 and an outlet port 74, and a porous filter element 175. The inlet port 72 is in fluid communication with the bypass channel 64 by means of conduit 76.

In operation, when the engine is first started up, the flow rate of incoming fuel (see arrow A in FIG. 1) through the bypass channel 64 is insufficient to turn the drum 36 of the centrifuge 12 at a velocity fast enough to efficiently separate foreign particles and water from the fuel. Therefore it is desirable that the fuel temporarily bypass the centrifuge 12. To accomplish this, the centrifugal force actuated valve device 58 is preset to remain closed at rotational speeds of the drum 36 which are insufficient for the separation of water and particulate matter. This prevents fuel from flowing through the aperture 56 into the interior 44 of the core 42. Rather, the incoming fuel is routed through the bypass channel 64 and fluid carrying conduit 76 (see arrow B in FIG. 1) into the porous filter 14 and through the filter element 75 where foreign particles and water are separated out (see arrow C in FIG. 1). The clean fuel then passes out of the filter 14 through the outlet port 74, through the pressure actuated valve 26 (see arrow D in FIG. 1) through conduit 24 (see arrow E) and into exit conduit 20.

During the foregoing events the pressure of the fuel flowing through the filter 14 is sufficient to maintain the valve 26 in its open position allowing filtered fuel to pass therethrough and ultimately to the engine. As operation continues, however, the flow rate of incoming fuel becomes high enough to operate the hydraulic motor 68 and hence the drum 36 at a rotational speed high enough to effect the separation of particles and water from the fuel. At this point, the centrifugal force actuated valve 58 opens the aperture 56 into the hollow interior 44 of the core 42 allowing centrifuged fuel to flow through the centrifuge to the engine. Diverting the fuel flow through the centrifuge causes the fluid pressure in the conduit 76 and filter 14 to decrease below a value sufficient to hold the pressure actuated valve 26 open. The entire volume of incoming fuel from the fuel tank is thus routed through the branch aperture 66 and into the centrifuge inlet port 38 (see arrows F in FIG. 1). The incoming fuel passes through the inlet passages 50 in the drum 36 (see arrow G in FIG. 1) and into the interior of the drum 36 where it impinges upon the vanes 62 (see arrow H in FIG. 1) further adding to the driving force which causes the drum 36 to rotate.

As the drum 36 rotates, the heavier foreign particles and water are caused to migrate outwardly, the particles packing against the interior annular wall of the drum 36 as shown at 80 in FIG. 1, and the water extracted from the fuel passes through the aperture 52 (see arrow J in FIG. 1) and into the hollow interior 34 of the centrifuge (see arrows K in FIG. 1) where it is subsequently drained off through the drain port 54. The clean fuel passes between the baffle 60 and the drum 36 and then migrates inwardly (see arrows L in FIG. 1) of the rotating drum 36 to the now open aperture 56 and into the hollow interior of the core 42 (see arrows M in FIG. 1). The clean fuel in the interior 44 of the core 42 then flows through the passageway 48, through the outlet port 40 into the conduit 22, to the conduit 20 and then to the engine (see arrow N in FIG. 1).

Comparative results to be expected can be seen from the following. Six commercially available filter elements were installed in military engines (two elements per engine). A mixture of fine dust and asphaltines was added to the fuel in a laboratory set-up. When the pressure drop across the elements reached 20 psi at a flow rate of 120 gallons per hour the elements were considered plugged. The weight of filtered solids varied from 0.08 to 0.15 pounds per element with an average of 0.11 pounds per element or 0.22 pounds per engine. Experience indicates that such solids pack to a density of about 0.05 pounds per cubic inch leading to an expected capacity of 2.4 pounds for the average centrifuge of the type shown in FIG. 1. Thus, one can expect about a 10 to 1 increase in filter life with the use of the present invention.

Figure 2:
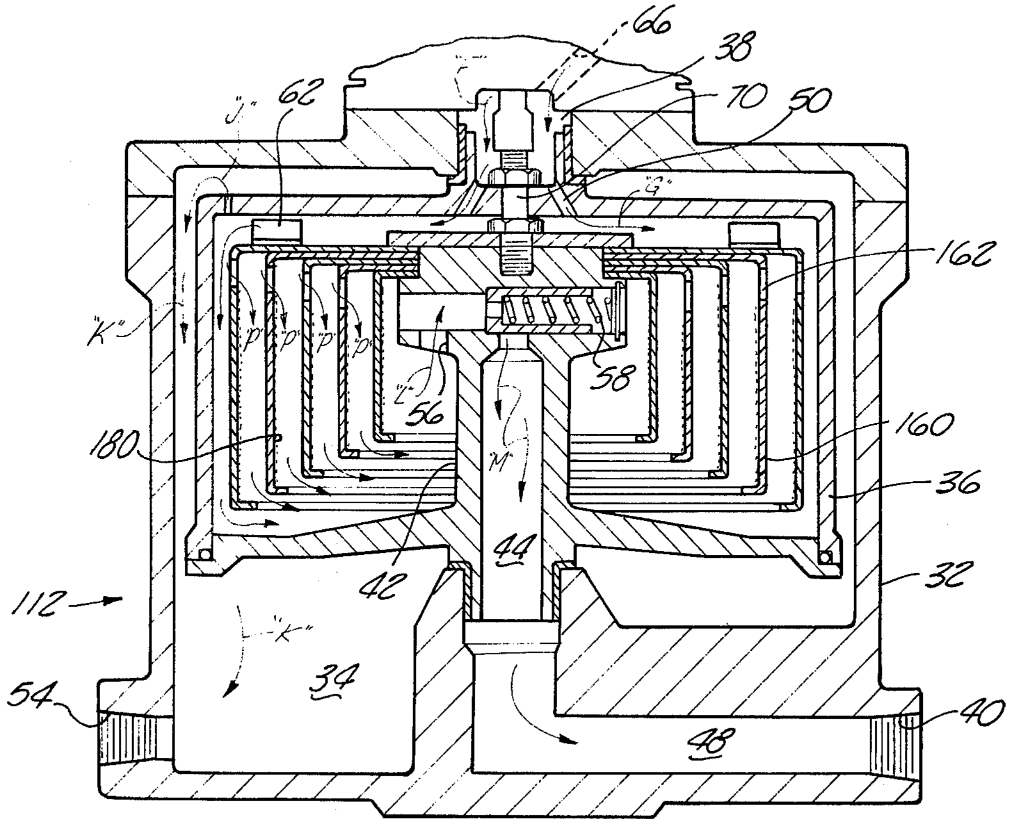
FIG. 2 is a cross sectional view of a second embodiment of a centrifuge which can be used in the purification system of the invention.

FIG. 2 illustrates a centrifuge 112 similar to construction to the centrifuge 12 shown in FIG. 1 except that a plurality of concentrically disposed spaced apart cylindrical baffles, such as baffle 160, are substituted for the single baffle 60. At least one aperture, such as aperture 162, is formed in each of the baffles 160 to provide for the passage of fuel inwardly of the drum 36 to the aperture 56 in the core 42 (see arrows P in FIG. 2). The purpose of multiplying the number of baffles 160 is to provide additional surfaces against which foreign particles may pack, as indicated at 180, and to decrease the distance through which the particles must migrate radially outwardly of the drum 36 before they reach a surface against which to pack.

Figure 4:
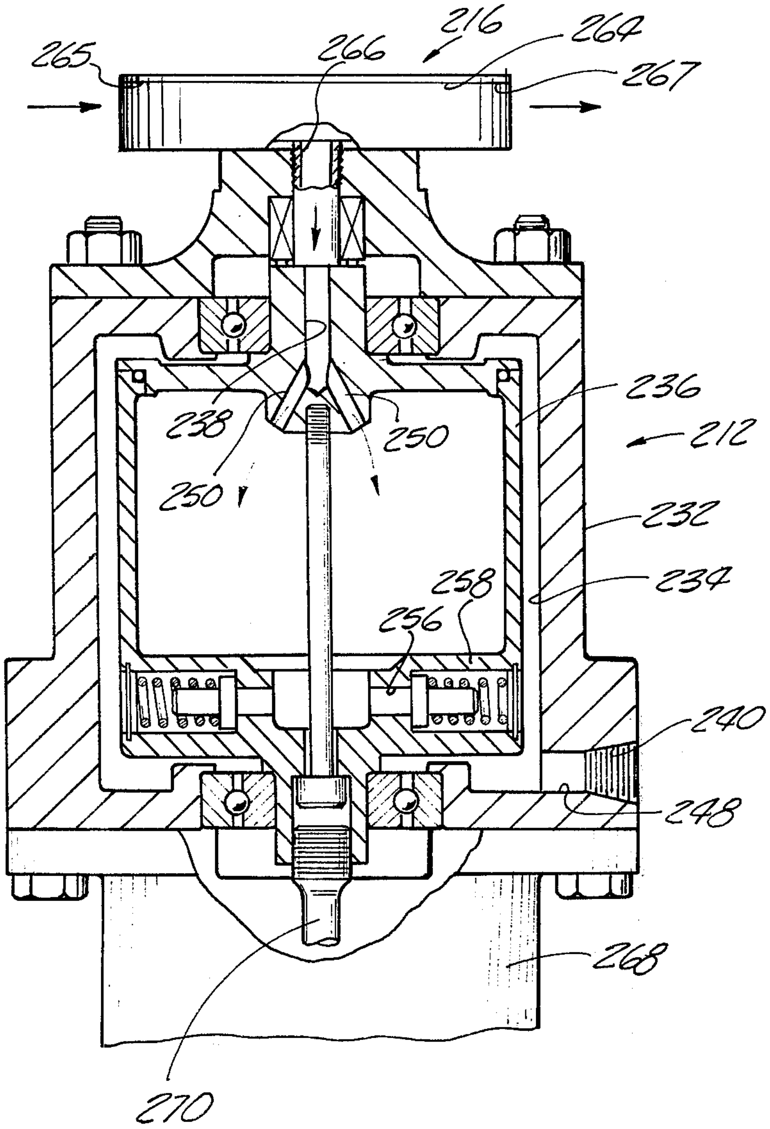
FIG. 4 is a cross sectional view of a third embodiment of a centrifuge which can be used in the purification system of the invention.

Referring to FIG. 4, there is illustrated a further construction of a centrifuge 212 which is similar to the centrifuge 112 of FIG. 2 and the centrifuge 12 of FIG. 1 except in the following particulars.

The centrifuge 212 comprises a housing 232 having a hollow interior 234 and a hollow rotating drum 236 disposed within the hollow interior 234. The housing 232 includes a liquid fuel inlet port 238 and a fuel outlet port 240. The rotating drum 236 comprises inlet passageways 250 which establish fluid communication between the branch aperture 266 and the inlet port 238. A conduit 256 leads to a centrifugal force actuated valve 258 which controls the flow of clean fuel from the centrifuge 212. A fluid bypass 216 comprising a bypass channel 264 having an inlet 265 in fluid communication with a fuel tank, an outlet 267 in fluid communication with a conventional filter (such as filter 14) and a branch aperture 266 is in fluid communication with the inlet port 238 for supplying fuel to the centrifuge 212 after engine start-up. The hollow rotating drum 236 is driven by, for example, an electric motor 268 drivingly connected to a drive shaft 270 so that the rotational speed of the drum 236 is independent of the velocity of the fuel flowing through the system. The fuel outlet port 240 from the centrifuge is connected to the conduit 22 for delivering clean fuel to conduit 20 for use in an engine.

In operation, when the engine is first started up, the fuel flows through the inlet 265, through the bypass channel 264, through outlet 267 to the porous filter 14 and subsequently to the engine. Concurrently, the electric motor 268 is started and rotates the drum 236. When the rotational speed of the drum 236 is high enough to effect the separation of foreign particles and water from the fuel, the centrifugal force activated valve device 258 opens the aperture 256 allowing fuel to flow through the centrifuge to the engine. The fuel flowing through the bypass channel 264 then meets less flow resistance in the branch aperture 266 than through the conduit 76 to the filter 14 and, therefore, follows the branch aperture 266. This in turn causes the fluid pressure in the conduit 76 and filter 14 to decrease below a value sufficient to hold the pressure activated valve 26 open. The entire volume of incoming fluid from the fuel tank is thus routed through the branch aperture 266 and into the centrifuge inlet port 238 (see arrows H in FIG. 4).

The foregoing detailed descriptions are given primarily for clearness of understanding and no unnecessary limitations should be understood therefrom, for modifications will be obvious to those skilled in the art and may be made without departing from the spirit of the invention or the scope of the appended claims.

I claim:

1. In a liquid fuel flow system wherein fuel flowing through said system under pressure between a source of fuel and a user of such fuel is freed from contaminants, the improvement which comprises the combination of a. a centrifuge having an inlet port in liquid communication with said source, an outlet port in liquid communication with said user, and a rotatable cylindrical drum adapted to effect the packing of particulate matter against the inside wall thereof;

b. means for rotating said centrifuge;

c. a filter having an inlet port in liquid communication with said source, and an outlet port in liquid communication with said user; and d. bypass means to effect the flow of fuel through either said centrifuge or said filter, said means comprising a first valve responsive to centrifugal force to effect the flow of fuel through said centrifuge and a second valve responsive to fuel pressure above a predetermined level for effecting the flow of fuel through said filter, and e. wherein flow of fuel through said centrifuge reduces the pressure of said fuel below said predetermined pressure.

2. The system as defined in claim 1 wherein said centrifuge drum comprises, in a wall thereof, a port for the removal of water separated from said fuel.

3. The system as defined in claim 1 wherein said centrifuge comprises a cylindrical baffle inside said drum and concentric therewith, said baffle adapted to direct incoming fuel toward the inner wall of said drum and to restrict its flow toward the center of said drum.

4. The system as defined in claim 3 wherein there are a plurality of said baffles each concentric with the others.

5. The system as defined in claim 1 wherein said centrifuge comprises a motor to effect the rotation of said drum.

6. The system as defined in claim 1 wherein said system comprises a hydraulic motor which effects the rotation of said drum responsively to fuel flow in said system.

7. The system as defined in claim 1 wherein said centrifuge drum comprises, in a wall thereof, a port for the removal of water separated from said fuel; said centrifuge comprises a cylindrical baffle inside said drum and concentric therewith; and said system comprises a hydraulic motor which effects the rotation of said drum responsively to fuel flow in said system.

* * * * *